United States Patent
Pedicini et al.

[11] Patent Number: 6,106,962
[45] Date of Patent: Aug. 22, 2000

[54] AIR MANAGER CONTROL USING CELL VOLTAGE AS AUTO-REFERENCE

[75] Inventors: Christopher S. Pedicini, Canton; Gary E. Gray, Marietta, both of Ga.

[73] Assignee: AER Energy Resources Inc., Smyrna, Ga.

[21] Appl. No.: 08/936,206

[22] Filed: Sep. 24, 1997

[51] Int. Cl.[7] .................................................. H01L 12/06
[52] U.S. Cl. ................................ 429/13; 429/23; 429/61; 429/83
[58] Field of Search .................................. 429/13, 21, 23, 429/61

[56] References Cited

U.S. PATENT DOCUMENTS

| | | | |
|---|---|---|---|
| 737,613 | 9/1903 | Halsey . | |
| 1,112,861 | 10/1914 | Snyder . | |
| 1,285,659 | 11/1918 | Ford . | |
| 1,363,889 | 12/1920 | Linebarger . | |
| 2,273,244 | 2/1942 | Ambruster | 136/166 |
| 2,275,281 | 3/1942 | Berl | 136/97 |
| 2,468,430 | 4/1949 | Derksen | 136/173 |
| 2,687,448 | 8/1954 | Gulick | 136/179 |
| 2,759,038 | 8/1956 | Marsal | 136/136 |
| 2,907,809 | 10/1959 | Southworth | 136/121 |
| 3,072,284 | 1/1963 | Luhman | 220/44 |
| 3,160,528 | 12/1964 | Dengler | 136/86 |
| 3,288,644 | 11/1966 | Delfino | 136/86 |
| 3,372,060 | 3/1968 | Platner | 136/86 |
| 3,382,238 | 5/1968 | Dolfini | 260/239.1 |
| 3,395,047 | 7/1968 | Terry | 136/86 |
| 3,411,951 | 11/1968 | Gelting | 136/86 |
| 3,436,270 | 4/1969 | Oswin | 136/120 |
| 3,457,155 | 7/1969 | Kent | 136/86 |
| 3,473,963 | 10/1969 | Sanderson | 136/86 |
| 3,523,830 | 8/1970 | Baker | 136/86 |
| 3,532,548 | 10/1970 | Starchurski | 136/164 |

(List continued on next page.)

FOREIGN PATENT DOCUMENTS

| | | |
|---|---|---|
| 0 440 060 | 1/1981 | European Pat. Off. . |
| 0 265 242 | 10/1987 | European Pat. Off. . |
| 0 293 007 | 11/1988 | European Pat. Off. . |
| 0 294 327 | 12/1988 | European Pat. Off. . |
| 0 341 189 | 11/1989 | European Pat. Off. . |
| 0 417 324 | 3/1991 | European Pat. Off. . |
| 0 476 484A2 | 9/1991 | European Pat. Off. . |
| 1575640 | 6/1969 | France . |
| 2 353 142 | 12/1977 | France . |
| 32 39 396 | 10/1982 | Germany . |
| 48 27096 | 8/1973 | Japan . |
| 59 134570 | 8/1984 | Japan . |
| 60091569 | 5/1985 | Japan . |
| 6 311 0558 | 5/1988 | Japan . |
| 434 5773 | 1/1992 | Japan . |
| 50 40773 | 12/1995 | Japan . |
| 1176488 | 1/1970 | United Kingdom . |
| WO 90/11625 | 10/1990 | WIPO . |
| WO 93/18556 | 9/1993 | WIPO . |
| WO 93/19495 | 9/1993 | WIPO . |
| WO 94/02966 | 2/1994 | WIPO . |
| WO 94/08358 | 4/1994 | WIPO . |
| WO 94/25991 | 11/1994 | WIPO . |

OTHER PUBLICATIONS

The Search for Better Batteries, IEEE Spectrum May 1995.
Microprocessor Voltage Monitors with Programmable Voltage Detection, Maxim 1995.

*Primary Examiner*—Stephen Kalafut
*Attorney, Agent, or Firm*—Jones & Askew LLP

[57] ABSTRACT

An air manager system for a metal-air battery. The system includes a housing for enclosing at least one metal-air cell with an air electrode. The housing also has at least one air inlet opening, at least one air outlet opening, and a fan positioned to force air through the openings when the fan is turned on. These openings are unobstructed and sized to eliminate substantially the air flow through the openings when the fan is turned off. The system also includes fan control means having voltage sensing means to monitor the voltage across the air electrode and to operate the fan when the voltage reaches predetermined levels.

26 Claims, 3 Drawing Sheets

U.S. PATENT DOCUMENTS

| | | | |
|---|---|---|---|
| 3,551,208 | 12/1970 | Starchurski | 136/86 |
| 3,553,029 | 1/1971 | Kordesch et al. | 136/86 |
| 3,576,667 | 4/1971 | Keating et al. | 136/86 |
| 3,600,233 | 8/1971 | Coffey et al. | 136/166 |
| 3,607,423 | 9/1971 | Bertioli | 136/86 |
| 3,615,839 | 10/1971 | Thompson | 136/86 |
| 3,615,860 | 10/1971 | Teriecke | 136/107 |
| 3,740,636 | 6/1973 | Hogrefe et al. | 320/2 |
| 3,744,516 | 7/1973 | Rowe | 137/587 |
| 3,871,920 | 3/1975 | Grebier et al. | 136/86 |
| 3,898,548 | 8/1975 | Perelle et al. | |
| 3,904,441 | 9/1975 | Badger | 136/177 |
| 3,909,302 | 9/1975 | Mermelstein | 136/177 |
| 3,963,519 | 6/1976 | Louie | 136/86 |
| 3,975,210 | 8/1976 | Warnock | 136/86 |
| 3,977,901 | 8/1976 | Buzzelli | 136/86 |
| 3,994,748 | 11/1976 | Kunz et al. | |
| 4,002,496 | 1/1977 | Nitta et al. | 429/53 |
| 4,054,725 | 10/1977 | Tuburaya | 429/29 |
| 4,098,964 | 7/1978 | Reber | 429/86 |
| 4,105,830 | 8/1978 | Kordesch . | |
| 4,112,198 | 9/1978 | Przbyla et al. | 429/27 |
| 4,112,199 | 9/1978 | Dunlop et al. | 429/29 |
| 4,118,544 | 10/1978 | Przbyla et al. | 429/27 |
| 4,139,846 | 2/1979 | Conforti | 340/636 |
| 4,152,489 | 5/1979 | Chottiner | 429/27 |
| 4,177,327 | 12/1979 | Mathews et al. | 429/27 |
| 4,189,526 | 2/1980 | Cretzmeyer et al. | 429/13 |
| 4,207,514 | 6/1980 | Klein | 320/44 |
| 4,221,644 | 9/1980 | La Barre . | |
| 4,246,324 | 1/1981 | de Nora et al. | 429/17 |
| 4,262,062 | 4/1981 | Zatsky | 429/27 |
| 4,279,970 | 7/1981 | Breault et al. | 429/35 |
| 4,298,666 | 11/1981 | Taskier | 429/206 |
| 4,318,092 | 3/1982 | Cowles et al. | 340/636 |
| 4,352,067 | 9/1982 | Ottone | 324/434 |
| 4,359,510 | 11/1982 | Taskier | 429/144 |
| 4,364,805 | 12/1982 | Rogers | 204/98 |
| 4,369,235 | 1/1983 | Bursell | 429/27 |
| 4,448,858 | 5/1984 | Graf et al. | 429/49 |
| 4,484,691 | 11/1984 | Lees | 220/89 |
| 4,490,443 | 12/1984 | Ruch et al. | 429/27 |
| 4,493,880 | 1/1985 | Lund | 429/97 |
| 4,521,497 | 6/1985 | Tamminen | 429/27 |
| 4,588,660 | 5/1986 | Shimizu et al. | 429/35 |
| 4,588,661 | 5/1986 | Kaufman et al. | 429/36 |
| 4,620,111 | 10/1986 | McArthur et al. | 307/150 |
| 4,626,482 | 12/1986 | Hamlen et al. | 429/27 |
| 4,687,714 | 8/1987 | Oltman et al. | 429/27 |
| 4,693,946 | 9/1987 | Niksa et al. . | |
| 4,729,930 | 3/1988 | Beal et al. | 429/13 |
| 4,738,905 | 4/1988 | Collins | 429/36 |
| 4,745,038 | 5/1988 | Brown | 429/27 |
| 4,756,980 | 7/1988 | Niksa et al. | 429/27 |
| 4,828,939 | 5/1989 | Turley et al. | 429/38 |
| 4,842,963 | 6/1989 | Ross, Jr. | 429/21 |
| 4,857,885 | 8/1989 | Umerez | 340/321 |
| 4,871,627 | 10/1989 | Strong et al. | 429/27 |
| 4,885,217 | 12/1989 | Hoge | 429/27 |
| 4,885,218 | 12/1989 | Andou et al. | 429/53 |
| 4,894,295 | 1/1990 | Cheiky | 429/77 |
| 4,908,281 | 3/1990 | O'Callaghan | 429/27 |
| 4,911,993 | 3/1990 | Turley et al. | 429/27 |
| 4,913,983 | 4/1990 | Cheiky | 429/13 |
| 4,927,717 | 5/1990 | Turley et al. | 429/27 |
| 4,929,931 | 5/1990 | McCuen | 340/636 |
| 4,950,561 | 8/1990 | Niksa et al. | 429/27 |
| 4,957,826 | 9/1990 | Cheiky | 429/27 |
| 5,024,904 | 6/1991 | Curiel | 429/27 |
| 5,047,961 | 9/1991 | Simonsen | 364/550 |
| 5,069,986 | 12/1991 | Dworkin et al. | 429/27 |
| 5,084,364 | 1/1992 | Quaadvliet | 429/34 |
| 5,093,213 | 3/1992 | O'Callaghan | 429/27 |
| 5,156,925 | 10/1992 | Lapp | 429/19 |
| 5,183,222 | 2/1993 | Ramsey, Jr. | 244/53 |
| 5,187,746 | 2/1993 | Narisawa | 381/68.7 |
| 5,191,274 | 3/1993 | Lloyd et al. | 320/2 |
| 5,196,275 | 3/1993 | Goldman et al. | 429/27 |
| 5,208,526 | 5/1993 | Goldman et al. | 320/2 |
| 5,258,239 | 11/1993 | Kobayashi . | |
| 5,260,144 | 11/1993 | O'Callaghan | 429/14 |
| 5,304,431 | 4/1994 | Schumm, Jr. | 429/27 |
| 5,306,579 | 4/1994 | Shepard, Jr. et al. | 429/40 |
| 5,318,861 | 6/1994 | Harats et al. | 429/21 |
| 5,328,777 | 7/1994 | Bentz et al. | 429/27 |
| 5,328,778 | 7/1994 | Woodruff et al. | 429/27 |
| 5,343,137 | 8/1994 | Kitaoka et al. | 320/13 |
| 5,354,625 | 10/1994 | Bentz et al. | 429/17 |
| 5,356,729 | 10/1994 | Pedicini . | |
| 5,362,577 | 11/1994 | Pedicini | 429/27 |
| 5,366,822 | 11/1994 | Korall et al. | 429/27 |
| 5,387,477 | 2/1995 | Cheiky | 429/26 |
| 5,418,080 | 5/1995 | Korall et al. | 429/27 |
| 5,434,016 | 7/1995 | Benz et al. | 429/23 X |
| 5,447,805 | 9/1995 | Harats et al. | 429/27 |
| 5,506,067 | 4/1996 | Tinker | 429/27 |
| 5,536,590 | 7/1996 | Chieky | 429/7 |
| 5,560,999 | 10/1996 | Pedicini et al. | 429/27 |
| 5,563,004 | 10/1996 | Buzzelli et al. | 429/61 X |
| 5,691,074 | 11/1997 | Pedicini | 429/27 |
| 5,721,064 | 2/1998 | Pedicini et al. | 429/27 | ns
AIR MANAGER CONTROL USING CELL VOLTAGE AS AUTO-REFERENCE

TECHNICAL FIELD

The present invention relates generally to a battery for electrical power, and more particularly relates to an air-manager system for a metal-air battery.

BACKGROUND OF THE INVENTION

Metal-air battery cells include an air permeable cathode and an anode separated by an aqueous electrolyte. During discharge of a metal-air battery, such as a zinc-air battery, oxygen from the ambient air is converted at the cathode to hydroxide, zinc is oxidized at the anode by the hydroxide, and water and electrons are released to provide electrical energy. Metal-air batteries have a relatively high energy density because the cathode utilizes oxygen from the ambient air as a reactant in the electrochemical reaction, rather than a heavier material such as a metal or a metallic composition. Metal-air battery cells are often arranged in multiple cell battery packs within a common housing to provide a sufficient power output.

A steady supply of oxygen to the air cathodes is necessary to operate the metal-air battery. Some prior systems sweep a continuous flow of new ambient air across the air cathodes at a flow rate sufficient to achieve the desired power output. Such an arrangement is shown in U.S. Pat. No. 4,913,983 to Cheiky. Cheiky uses a fan within the battery housing to supply a predetermined flow of ambient air to a pack of metal-air battery cells. Before the battery is turned on, a mechanical air inlet door and an air outlet door are opened and the fan is activated to create the flow of air into, through, and out of the housing. After operation of the battery is complete, the air doors are sealed. The remaining oxygen in the housing slowly discharges the anode until the remaining oxygen is substantially depleted. The residual low power remaining in the cells is disclosed as being sufficient to restart the fan the next time the battery is used.

To ensure that a sufficient amount of oxygen is swept into the housing during use, Cheiky discloses a fan control means with a microprocessor to vary the speed of the fan according to pre-determined power output requirements. The greater the power requirement for the particular operation, the greater the fan speed and the greater the air flow across the battery cells. Several predetermined fan speeds are disclosed according to several predetermined power levels of the load. The disclosed load is a computer. The fan speed is therefore varied according to the power requirements of the various functions of the computer. Conversely, many other known air manager systems run the fan continuously when a load is applied.

In addition to the need for a sufficient amount of oxygen, another concern with metal-air batteries is the admission or loss of too much oxygen or other gasses through the housing. For example, one problem with a metal-air battery is that the ambient humidity level can cause the battery to fail. Equilibrium vapor pressure of the metal-air battery results in an equilibrium relative humidity that is typically about 45 percent. If the ambient humidity is greater than the equilibrium humidity within the battery housing, the battery will absorb water from the air through the cathode and fail due to a condition called flooding. Flooding may cause the battery to leak. If the ambient humidity is less than the equilibrium humidity within the battery housing, the metal-air battery will release water vapor from the electrolyte through the air cathode and fail due to drying out. The art, therefore, has recognized that an ambient air humidity level differing from the humidity level within the battery housing will create a net transfer of water into or out of the battery. These problems are particularly of concern when the battery is not in use, because the humidity tends to either seep into or out of the battery housing over an extended period of time.

Another problem associated with metal-air batteries is the transfer of carbon dioxide or other contaminates from the ambient air into the battery cell. Carbon dioxide tends to neutralize the electrolyte, such as potassium hydroxide. In the past, carbon dioxide absorbing layers have been placed against the exterior cathode surface to trap carbon dioxide. An example of such a system is shown in U.S. Pat. No. 4,054,725.

Maintaining a battery cell with proper levels of humidity and excluding carbon dioxide has generally required a sealed battery housing. As discussed above, prior art systems such as that disclosed by Cheiky have used a fan of some sort to force ambient air through large openings in the battery housing during use and a sealed air door during non-use. If the air door is not present or not shut during non-use, however, large amounts of ambient air will seep into the housing. This flow of air would cause the humidity and carbon dioxide problems within the housing as discussed above. The oxygen in the ambient air also would cause the cell to discharge, thereby leading to "leakage" current and a reduction in cell efficiency and lifetime.

Even with the use of air doors, however, a certain amount of oxygen and contaminates tend to seep into the cell during non-use. Some leakage current is therefore inevitable. Although the air doors limit this leakage current and the other problems discussed above, the use of the air doors increases the complexity of the battery housing itself and increases the cost and time of manufacture of the overall battery. Another drawback of a mechanical air door is the fact that the door must be opened and closed, thus adding several more steps to the use of the battery.

The assignee of the present invention is also the owner of application Ser. No. 08/544,707, entitled "Diffusion Controlled Air Door," filed Oct. 18, 1995, now U.S. Pat. No. 5,691,074 and application Ser. No. 08/556,613, entitled "Diffusion Controlled Air Vent and Recirculation Air Manager for a Metal-Air Battery," filed Nov. 13, 1995. These references disclose several preferred metal-air battery packs for use with the present invention and are incorporated herein by reference. The air inlet and outlet openings in the housing are sized with a length in the direction through the thickness of the housing being greater than a width in the direction perpendicular to the thickness of the housing. The openings are unobstructed and are sized to eliminate substantially the air flow into the air inlet opening and out of the air outlet opening when the fan is turned off.

The use of the open air door battery housings simplifies the design of the battery as a whole and simplifies the use of the battery. In fact, these battery housing designs allow the metal-air battery to act more like a conventional battery, i.e., the battery is available for the given load without any additional activity such as opening the air doors. The only requirement of these designs is that the fan or other air movement device must be turned on to provide a sufficient flow of oxygen for the cells.

Thus, although these open air door designs are closer to the goal of a metal-air battery that acts as a conventional battery, there is a need in the art for a metal-air battery that is largely self-regulating. Such a metal-air battery would be capable of accommodating both varying loads in an efficient manner and extended periods of inactivity without the need for a mechanical air door or a separate switch for the fan. The lack of a mechanical air door, however, cannot lead to excessive leakage current, flooding, drying out, or the excessive absorption of environmental contaminates.

In sum, the desired metal-air battery would be used in an identical manner to a conventional battery in that all the user needs to do is attach and activate the load. The battery itself would need no separate activation. Further, such a battery would have an energy efficient and quiet air manager system.

SUMMARY OF THE INVENTION

The present invention provides an air manager system for a metal-air battery. The system includes a housing for enclosing at least one metal-air cell with an air electrode. The housing also has at least one air inlet opening, at least one air outlet opening, and a fan positioned to force air through the openings when the fan is turned on. These openings are unobstructed and sized to eliminate substantially the air flow through the openings when the fan is turned off. The system also includes fan control means having voltage sensing means to monitor the voltage across the air electrode and to operate the fan when the voltage reaches predetermined levels.

The fan control means turns the fan on when the voltage across the metal-air cell is less than or equal to a predetermined voltage. The fan control means may first determine if a load is present on the metal-air cell before the fan is turned on. Likewise, the fan control means turns the fan off when the voltage across the cell is greater than or equal to a second predetermined voltage. The fan control means, the metal-air cells, and the fan are arranged in a circuit. The voltage sensing means includes a voltage monitor.

Specific embodiments of the present invention include a six volt metal-air battery with five metal-air cells. Such a battery has an energy to load rating of about 230 watt/hours at a drain rate of about 0.5 watt and about 220 watt/hours at a drain rate of about 1.0 watt. The predetermined voltage for turning the fan on is approximately 1.0 volt per cell, while the second predetermined voltage for turning the fan off is approximately 1.1 volt per cell. The voltage monitor turns the fan on when the voltage across the cell is less than or equal to approximately 1.0 volt per cell. Likewise, the voltage monitor turns the fan off when the voltage across the cell is greater than or equal to approximately 1.1 volt per cell.

The method of the present invention includes the steps of confining at least one metal-air cell with an air electrode within a housing. The housing has a fan, at least one unobstructed air inlet opening, and at least one unobstructed air outlet opening. The method further includes turning the fan on when the voltage across the metal-air cell is less than or equal to a predetermined voltage so as to circulate the air through the housing, and turning the fan off when the voltage across the metal-air cell is greater than or equal to a second predetermined voltage. The method may further include determining whether there is a load on the battery before turning the fan on when the voltage across the air electrode is less than or equal to the predetermined voltage.

Thus, it is an object of the present invention to provide an improved air manager system for a metal-air battery.

It is another object of the present invention to provide a self-regulating air manager system for a metal-air battery.

It is a further object of the present invention to provide an air manager system for a metal-air battery without mechanical air doors.

It is a still further object of the present invention to provide an air manger system for a metal-air battery with an automatic fan.

It is a still further object of the present invention to provide for an efficient air manager system for a metal-air battery.

It is a still further object of the present invention to provide for an air manager system for a metal-air battery with a long shelf life.

It is a still further object of the present invention to provide a quiet air manager system for a metal-air battery.

Other objects, features and advantages of the present invention will become apparent upon reviewing the following description of preferred embodiments of the invention, when taken in conjunction with the drawings and the appended claims.

DETAILED DESCRIPTION

Figure 1:
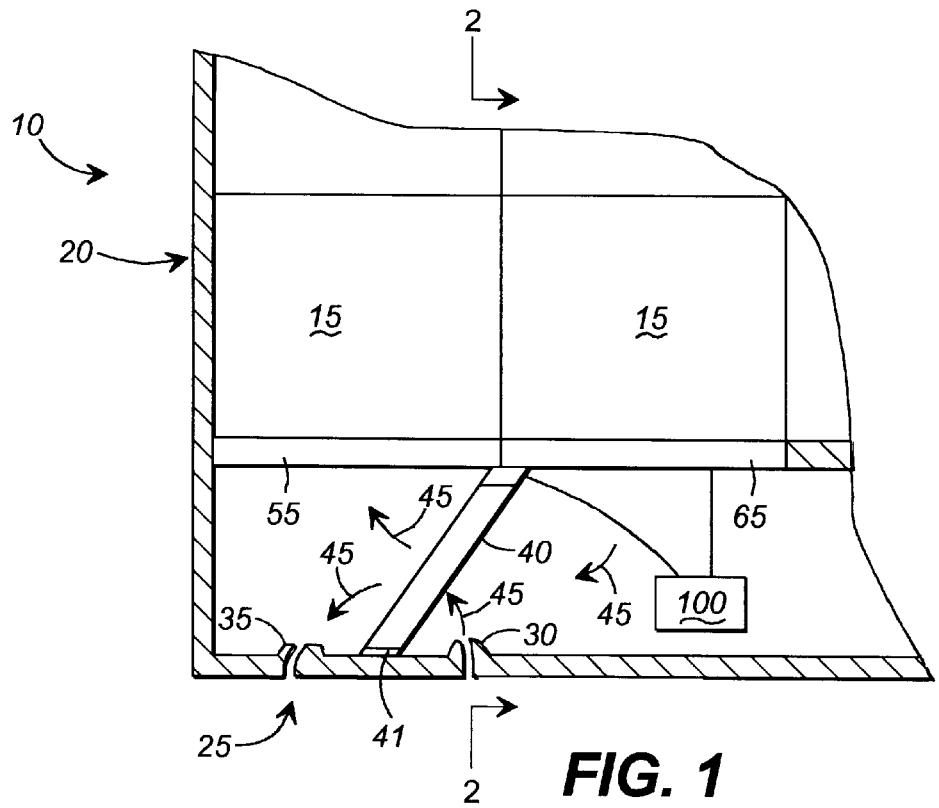
FIG. 1 is a cut-away diagrammatic top view of the battery housing embodying the present invention, showing the position of the cells, the fan, and the air openings, in combination with the direction of the flow of air with respect to the housing.

Referring now in more detail to the drawings, in which like numerals refer to like parts throughout the several views, FIGS. 1–4 show a metal-air battery 10 embodying the present invention. The metal-air battery 10 may be similar to that disclosed in commonly owned U.S. Pat. No. 5,641,588 to Sieminski, et al., commonly owned U.S. Pat. No. 5,356,729 to Pedicini, et al., commonly owned U.S. Pat. No. 5,691,694 commonly owned application Ser. No. 08/556,613, which are incorporated herein by reference, or other known metal-air battery configurations.

The metal-air battery 10 includes a plurality of metal-air cells 15 enclosed within a housing 20. The housing 20 isolates the cells 15 from the outside air with the exception of a plurality of ventilation openings 25. In the embodiment shown in FIGS. 1 and 2, a single air inlet opening 30 and a single air outlet opening 35 are utilized. The number of openings 25 is not as important as the aggregate size of the openings 25 in connection with the shape of each opening 25.

Figure 2:
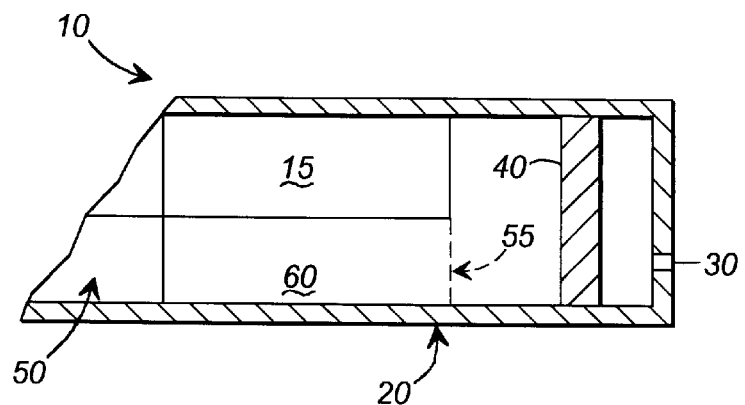
FIG. 2 is a vertical cross sectional view taken along line 2—2 of FIG. 1.

The housing 20 itself may be any type of conventional, substantially air-tight structure. The number of cells 15 within the housing 20 depends upon the nature of the load intended for the battery 10. The present invention is not dependent upon the configuration of the cells 15 within the housing 20 or the number of cells 15 within the housing 20. FIGS. 1 and 2 therefore show a cut-away view of a metal-air battery housing 20 showing only the essential elements of the present invention, i.e., a housing 20, one or more cells 15, and the air openings 25. Although only two cells 15 are shown in FIGS. 1 and 2, it is understood that the number and configuration of the cells 15 depends upon the power requirements for the battery 10.

A circulating fan 40 is provided for convective air flow both in and out of the housing 20 and to circulate and mix the gasses within the housing 20. The arrows shown in FIG. 1 represents a typical circulation of gasses into, out of, and within the housing 20 to provide the reactant air to the cells 15. The capacity of the fan 40 also depends upon the size of the housing 20 and the power demands of the battery 10. The term "fan" 40 as used herein is intended to mean any device to move air, including a pump.

The fan 40 may be positioned within the housing 20 or adjacent to the housing 20 in communication with one of the openings 25. If the fan 40 is located within the housing 20, the ventilation openings 25 are positioned such that the inlet opening 30 and the outlet opening 35 are positioned on opposite sides of the fan 40. The only requirement for the positioning within the housing 20 of the fan 40 and the openings 25 is that they are in sufficiently close proximity to each other to create a convective air flow into, through, and out of the housing 20. The fan 40 may be mounted within or adjacent to the housing 20 in any convenient manner. The fan 40 is generally sealed into place by a gasket 41 or other conventional means to ensure that the low pressure and high pressure sides of the fan 40 are isolated from one another.

As is shown in FIG. 2, the plurality of cells 15 within housing 20 are generally arranged such that a reactant air plenum 50 is positioned under the cells 15. The air plenum 50 defines an air plenum inlet 55, an air passageway 60, and an air plenum outlet 65. The fan 40 is generally positioned between and isolates the air plenum inlet 55 from the air plenum outlet 65 for efficient air flow through the housing 20. Examples of air plenum designs are shown in the commonly-owned references cited above. As described above, the present invention is not dependent upon any particular air plenum design.

Figure 3:
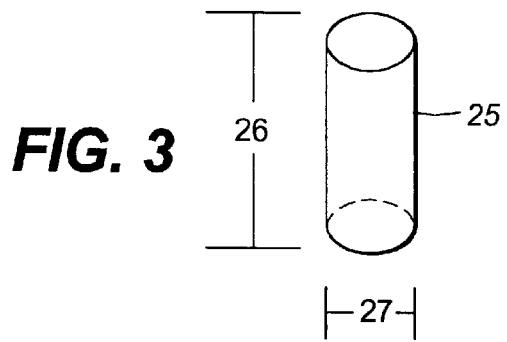
FIG. 3 is a diagrammatic pictorial view of a ventilation opening.

As is shown in FIG. 3, the ventilation openings 25 are preferably sized such that their length 26, i.e., the direction through the thickness of the housing 20, is greater than their width 27, i.e., the direction perpendicular to the thickness of the housing 20. By using a large enough ratio between the length 26 and the width 27 for the ventilation openings 25, it has been found that diffusion of air through the openings 25, without the assistance of the fan 40, is substantially eliminated. By "substantially eliminated," it is meant that the rate of diffusion of oxygen or contaminates through the openings 25 is so slow that humidity transfer or drain current is sufficiently small and has little appreciable impact on the efficiency or lifetime of the battery 10. In sum, the openings 25 are sufficiently long and narrow to provide a barrier to diffusion of gases therethrough when the fan 40 is turned off.

This required ratio between length 26 and width 27 is at least about two to one. These ratios are sufficient to prevent appreciable diffusion through the openings 25 when the fan 40 is turned off while permitting convective air flow therethrough when the fan 40 is turned on. The use of larger ratios between length 26 and width 27 is preferred. Depending upon the nature of the battery 10, the ratio can be more than 200 to 1.

In use, ambient air is drawn into the air inlet 30 by pull of the fan 40 when the fan 40 is turned on. As is shown by the arrows 45 in FIG. 1, the air is then drawn through the fan 40 and into the air plenum 50. The air enters the air plenum 50 through air plenum inlet 55, travels though the pathway 60 to provide a reactant air flow for the cells 15, and exits via the air plenum outlet 65. The air is then again drawn into the fan 40 where it either mixes when fresh incoming ambient air or is forced out of the housing 20 via air outlet 35. When the fan 40 is turned off, the rate of diffusion of air through the openings 25 is reduced to acceptable levels such that a mechanical air door is not required.

Figure 4:
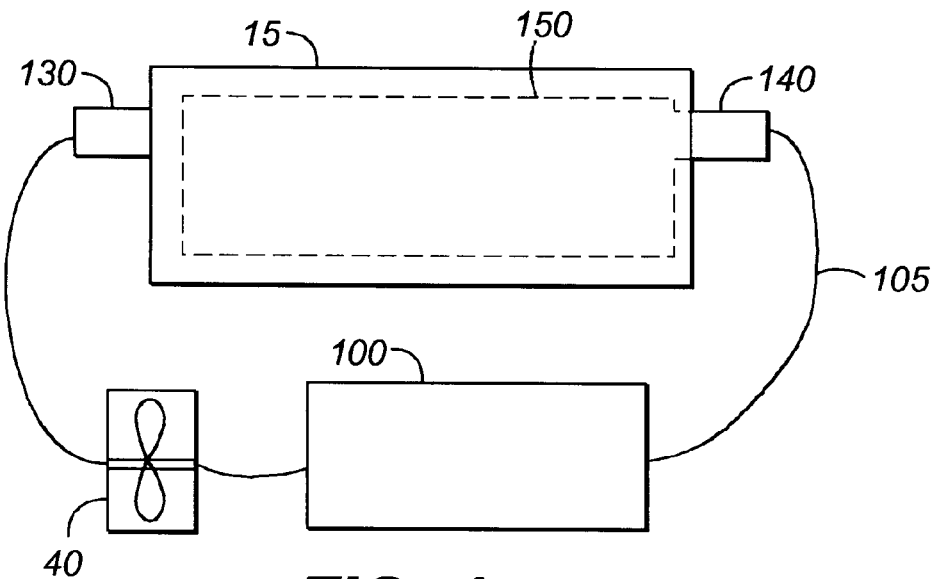
FIG. 4 is a schematic view of the voltage sensor circuit.

As is shown in FIGS. 1 and 4, the invention includes a voltage monitor 100 to determine the voltage across the cell 15 or other electrical characteristics and to control the operation of the fan 40. The voltage monitor 100 can be positioned at any convenient location within or adjacent to the housing 20. The preferred voltage monitor 100 is a programmable voltage detection or sensing device such as that sold by Maxim Integrated Products under the mark MAX8211 and MAX8212. Depending upon the desired operation of the fan, the voltage monitor 100 can be an analog circuit for a simple "on/off" switch or can incorporate a microprocessor (not shown) for a more complex algorithm. The voltage monitor 100 of FIGS. 1 and 4 is an analog circuit.

The voltage monitor 100 determines the voltage across the air electrode 150 of the cell 15. The air electrode 150 is shown in phantom lines in FIG. 4. Because the zinc potential within the air electrode 150 of each cell 15 is relatively stable, the air electrode 150 is used to sense the residual oxygen in the cell 15. As the oxygen within the housing 20 is depleted, the voltage across each air electrode 150 diminishes. Likewise, as the flow of oxygen into the housing 20 increases, the voltage across the air electrode 150 increases.

A preferred air electrode 150 is disclosed in commonly owned U.S. Pat. No. 5,569,551 and commonly owned U.S. Pat. No. 5,639,568, which are incorporated herein by reference. U.S. Pat. No. 5,639,568 discloses a split anode for use with a dual air electrode metal-air cell. Although the use of the invention with a zinc-air battery is disclosed, this invention should be understood as being applicable to other types of metal-air battery cells.

As is shown in FIG. 4, the voltage monitor 100 is connected to the cells 15 in a voltage monitor circuit 105 via a cathode tab 130 and an anode tab 140. The voltage monitor circuit 105 also includes the fan 40. All of the cells 15 within the housing 20 are connected in this circuit 105. The voltage across the cells 15 is continually monitored to ensure that the voltage does not drop below a predetermined voltage $V_{p1}$. If the voltage does drop to $V_{p1}$, the fan 40 is turned on and then runs continuously until the voltage is increased to a second predetermined voltage $V_{p2}$. The fan 40 is then turned off and remains off until the voltage again drops to $V_{p1}$. The predetermined voltages $V_{p1}$ and $V_{p2}$ are programmable values in the voltage monitor 100.

Figure 5:
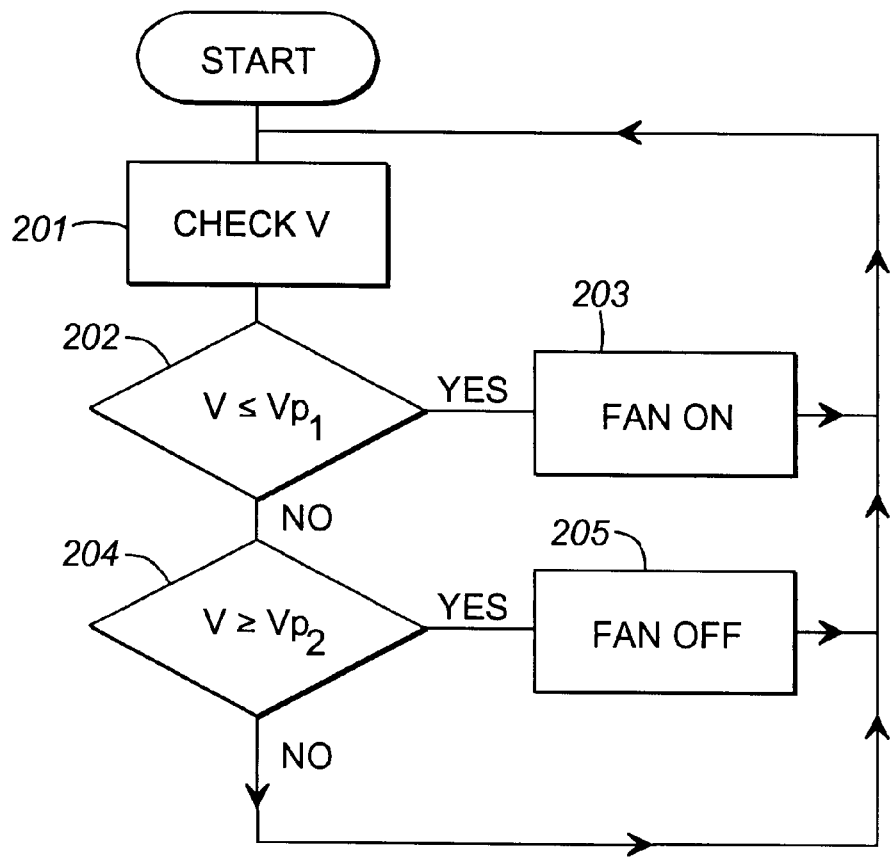
FIG. 5 is a flow chart showing the operation of the fan based upon the detected voltage.

The operation of the fan 40 is shown in FIG. 5. The algorithm is an "on/off" type with predetermined values. As is shown in step 201, the voltage monitor 100 measures the voltage across the air electrode 150. In step 202, the voltage monitor 100 determines if the voltage is less than or equal to $V_{p1}$. If so, the voltage monitor 100 turns on the fan 40 in step 203. If not, the voltage monitor 100 determines if the voltage is greater than or equal to $V_{p2}$ in step 204. If so, the voltage monitor 100 turns off the fan 40 in step 205. If not, the voltage monitor 100 returns to step 201. This algorithm may be modified to add an additional step of first checking if a load is present on the battery 10. If so, the voltage monitor 100 proceeds to step 201 as shown above. If not the fan 40 will remain in the off state.

Alternatively, the speed of the fan 40 maybe altered depending upon the drain rate of the battery 10 as a whole or other electrical parameters. In other words, the voltage monitor 100 can be replaced with other types of conventional electrical sensors known to those practicing in the art. For example, a conventional current sensor, i.e., a sense resistor, could be used. This monitor 100 can set the speed of a variable speed fan 40 as a function of current draw. Instead of the algorithm of FIG. 5, the circuit 105 would contain a conventional microprocessor with a look-up table to compare the determined current draw with a voltage input value for the fan 40. The input voltage and speed of the fan 40 varies with the determined output current drain. The physical arrangement of the components in this embodiment is the same as that described above.

The operation of the invention is shown in an example using a six (6) volt battery 10. Such a battery 10 has five (5) metal-air cells 15, with each cell 15 having an output of about 1.2 volt or slightly higher at about 1 to 4 amps. An upconverter (not shown) also may be used. The housing 20 has openings 25 with a length 26 to width 27 ratio of about four (4) to one (1). The gas flow through the housing when the fan 40 is on is about 15 to about 30 cubic inches per minute for an output current of about 1 amp. When the fan 40 is turned off, the gas flow rate is reduced to about 0 to about 0.03 cubic inches per minute or less, with a leakage current of less than 1 mA. The ratio of output current density with the fan 40 turned on to drain current density with the fan 40 turned off is expected to be at least 100 to 1 in an efficient battery 10. It is understood that the respective sizes, capacities, densities, flow rates, and other parameters discussed above are dependent upon the overall size and power requirements of the battery 10.

The first predetermined voltage $V_{p1}$ under which the voltage should not fall may be about 1.0 volts per cell 15 or about 5.0 volts for the battery 10 as a whole. The fan 40 is turned on when the voltage monitor 100 determines that the voltage of the battery 10 has reached about 1.0 volts per cell 15 or about 5.0 volts for the battery 10 as a whole. The fan 40 then stays on until the voltage of the battery 10 reaches about 1.1 volts per cell 15, or about 5.5 volts for the battery 10 a whole. The fan 40 remains off until the voltage again reached about 1.0 volts per cell 15 or about 5.0 volts for the battery 10 as a whole.

Assuming the drain rates given above, it would take approximately one month for the six (6) volt battery 10 of the present example to fade from about 1.1 volts per cell 15 to about 1.0 volts per cell 15 to trigger the fan 40 during periods of non-use. The shelf life of the battery 10 would be at least several years. The battery 10 would be immediately ready for use without the need for any independent activation of the battery 10 such as by turning on the fan 40 or by opening a mechanical air door. Rather, the battery 40 is ready for use. The activation of a load on the battery 10 will cause the voltage across the cells 15 to drop as the oxygen within the housing 20 is consumed. This voltage drop will activate the fan 40 until the proper amount of oxygen is introduced into the housing 20 and the proper voltage is restored.

Figure 6:
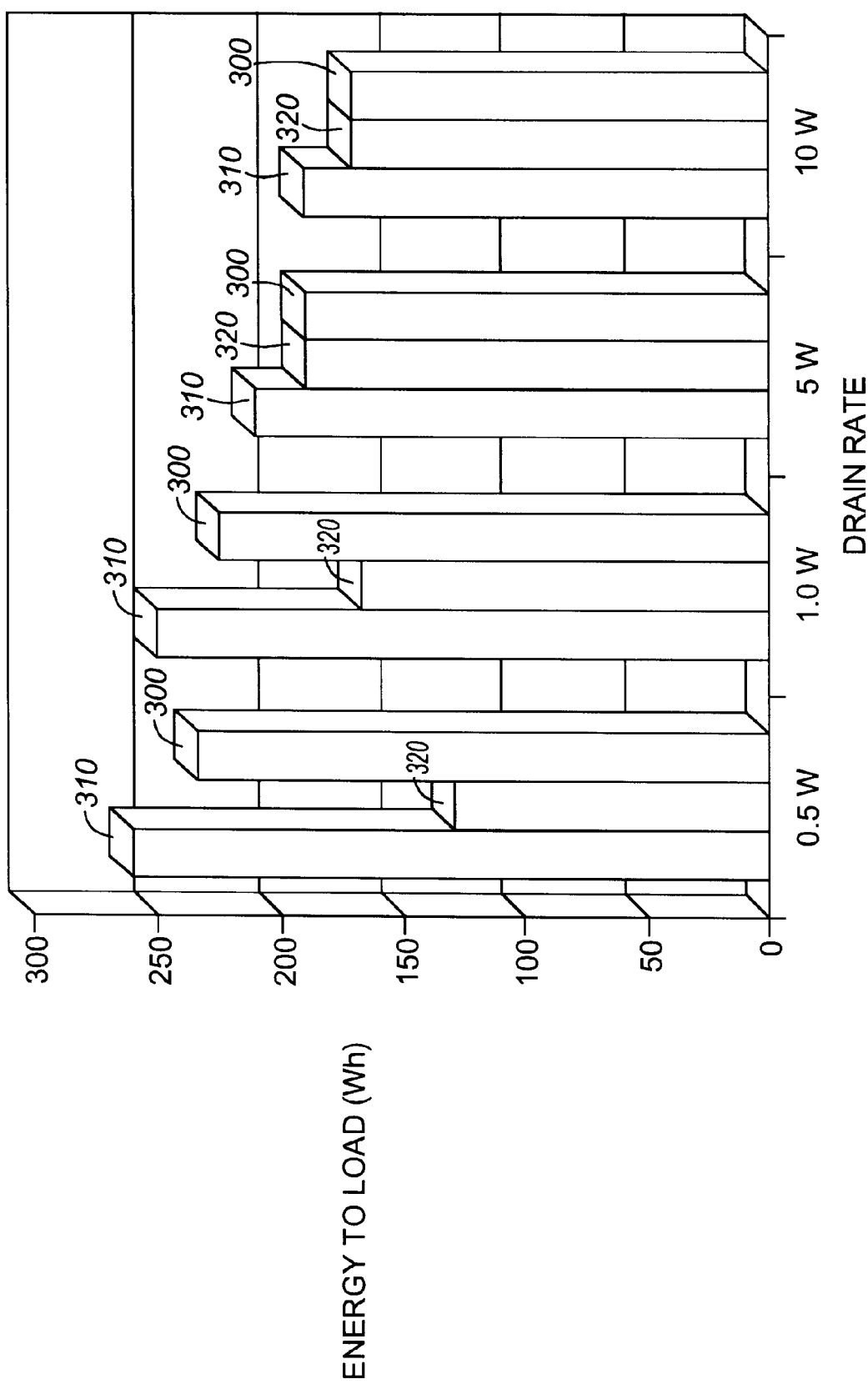
FIG. 6 is a comparison chart showing the power consumption of an air manager system in a six (6) volts battery with several fan options.

In addition to the present invention being self-regulating, the present invention also provides an energy efficient air manager system. The efficiency of the battery 10 as a whole is increased because the running of the fan 40 is minimized. FIG. 6 compares the energy to load ratio 300 of the present invention in terms of the energy to load ratio 310 of a battery without a fan and with the energy to load ratio 320 of a fan running constantly at various drain rates. As described above, most air manager systems either run the fan continuously or employ a variable speed fan as is described in Cheiky. As is shown in FIG. 6, the present invention provides efficiencies of essentially ninety percent (90%) of a air manager system without a fan.

For example, the energy to load ratio 300 of the present invention in a six (6) volts battery is about 235 Wh while the energy to load ratio 310 of an air manager system without a fan is about 250 Wh. The energy to load ratio 320 of an air manager system with a fan running continuously is only about 135 Wh. The pulsing fan operation of the present invention is therefore an improvement of almost 100 Wh as compared to a constantly running fan. The improvement is maintained until drain rates reach about 5 watts. At that point, the fan 40 of the present invention is essentially running continuously.

Although these efficiencies may be possible with the variable speed fan of Cheiky, the present invention uses a simple on/off switch rather than the complex, load specific algorithm disclosed therein. In other words, Cheiky requires a specific algorithm for each different type of load. The present invention, however, is available to provide power to almost any type of electrical device.

In sum, by pulsing the fan 40 as described herein, several goals are achieved:

1. The life of the battery 10 is maximized from the standpoint of environmental exposure. In other words, only enough oxygen is admitted into the housing 20 as is needed to maintain the predetermined voltages.

2. Power consumption of the fan 40 is minimized as a percentage of the power consumed by the battery 10 as a whole. For example, a fifty percent (50%) duty cycle may be all that is required at low drain rates. This decreases the overhead energy consumed by the battery 10 as a whole.

3. Because the fan 40 runs in a duty cycle, the battery 10 as a whole is quieter than a battery 10 with a continuously running fan 40.

The present invention therefore can provide a battery 10 with a relatively long shelf life without the need for a mechanical air door or a fan switch. The present invention can function as, for example, a power source of an emergency device than can be automatically activated because there is no need for a separate activation step. More importantly, the present invention provides for an efficient air manager system that minimizes the running of the fan 40 and the energy drain associated with the fan 40.

It should be understood that the foregoing relates only to preferred embodiments of the present invention, and that numerous changes may be made therein without departing from the spirit and scope of the invention as defined by the following claims.

We claim:

1. An air manager system for a metal-air battery, comprising:

a housing for enclosing at least one metal-air cell;

said at least one metal-air cell comprising an air electrode;

said housing having at least one air inlet opening and at least one air outlet opening;

a fan positioned to force said air into said air inlet opening and out of said air outlet opening when said fan is turned on;

said openings being unobstructed and said size of said openings substantially eliminating said air flow into said at least one air inlet opening and out of said at least one air outlet opening when said fan is turned off; and fan control means comprising voltage sensing means to monitor the voltage across said air electrode wherein the operation of said fan is responsive to said fan control means.

2. The air manager system for a metal-air battery of claim 1, wherein said fan control means turns said fan on when the voltage across said air electrode, as measured by said voltage sensing means, is less than or equal to a predetermined voltage.

3. The air manager system for a metal-air battery of claim 1, wherein said fan control means turns said fan off when the voltage across said air electrode, as measured by said voltage sensing means, is greater than or equal to a predetermined voltage.

4. The air manager system for a metal-air battery of claim 1, wherein said voltage sensing means comprises a voltage monitor.

5. The air manager system for a metal-air battery of claim 1, wherein said air electrode comprises a zinc anode.

6. The air manager system for a metal-air battery of claim 1, wherein said at least one metal-air cell, said fan, and said fan control means comprise a circuit.

7. The air manager system for a metal-air battery of claim 1, said metal-air battery comprises a six volt battery with five metal-air cells.

8. The air manager system of claim 7, wherein said metal-air battery has an energy to load rating of about 230 watt/hours at a drain rate of about 0.5 watt.

9. The air manager system of claim 7, wherein said metal-air battery has an energy to load rating of about 220 watt/hours at a drain rate of about 1.0 watt.

10. The air manager system for a metal-air battery of claim 7, wherein said fan control means turns said fan on when the voltage across said air electrode, as measured by said voltage sensing means, is less than or equal to a predetermined voltage and wherein said fan control means turns said fan off when the voltage across said electrode, as measured by said voltage sensing means, is greater than or equal to a second predetermined voltage.

11. The air manager system for a metal-air battery of claim 10, wherein said predetermined voltage is approximately 1.0 volt per cell.

12. The air manager system for a metal-air battery of claim 10, wherein said second predetermined voltage is approximately 1.1 volt per cell.

13. A self-regulating air manager system for a metal-air battery, comprising:
    a battery housing;
    at least one metal-air cell within said housing;
    said metal-air cell comprising an air electrode;
    a fan positioned within said housing;
    said housing comprising at least one air inlet sized to permit the entry of oxygen when said fan is on and to prevent substantially the transfer of gasses when said fan is off;
    said housing comprising at least one air outlet sized to permit the exit of gasses when said fan is on and to prevent substantially the transfer of gasses when said fan is off; and
    a voltage sensor circuit comprising said fan, said at least one metal-air cell, and a voltage monitor to determine the voltage across said metal-air cell, such that said voltage monitor operates said fan in response to indications of the voltage across said metal-air cell.

14. The self-regulating air manager system for a metal-air battery of claim 13, wherein said voltage monitor determines if a load is present on said metal-air battery.

15. The self-regulating air manager system for a metal-air battery of claim 14, wherein said voltage monitor turns said fan on when the voltage across said metal-air cell is less than or equal to a predetermined voltage after said voltage monitor determines that said load is present on said metal-air battery.

16. The self-regulating air manager system for a metal-air battery of claim 13, wherein said voltage monitor turns said fan on when the voltage across said metal-air cell is less than or equal to a predetermined voltage.

17. The self-regulating air manager system for a metal-air battery of claim 13, wherein said voltage monitor turns said fan off when the voltage across said metal-air cell is greater than or equal to a second predetermined voltage.

18. The self-regulating air manager system for a metal-air battery of claim 17, wherein said voltage monitor leaves said fan off until the voltage across said metal-air cell is again less than or equal to said predetermined voltage.

19. A method for controlling air flow in a metal-air battery, comprising the steps of:
    confining at least one metal-air cell within a housing, said at least one metal-air cell comprising a air electrode, and said housing comprising a fan therein, at least one unobstructed air inlet opening, and at least one unobstructed air outlet opening;
    turning said fan on when the voltage across said air electrode is less than or equal to a predetermined voltage so as to circulate air through said housing; and
    turning said fan off when the voltage across said air electrode is greater than or equal to a second predetermined voltage.

20. The method of claim 19, further including the step of determining whether there is a load on said battery before turning said fan on when the voltage across said air electrode is less than or equal to said predetermined voltage.

21. A apparatus for controlling air flow in a metal-air battery, comprising:
    a housing;
    said housing comprising a fan therein, at least one unobstructed air inlet opening, and at least one unobstructed air outlet opening;
    at least one metal-air cell confined within said housing;
    said at least one metal-air cell comprising a air electrode;
    means for turning said fan on when the voltage across said air electrode is less than or equal to a predetermined voltage so as to circulate air through said housing; and
    means for turning said fan off when the voltage across said air electrode is greater than or equal to a second predetermined voltage.

22. A apparatus for controlling air flow in a metal-air battery, comprising:
    a housing;
    said housing comprising a fan therein, at least one unobstructed air inlet opening, and at least one unobstructed air outlet opening;
    at least one metal-air cell confined within said housing;
    means for determining the current draw on said battery; and
    means for controlling the speed of said fan in response to said determination of said current draw.

23. An air manager system for a metal-air battery, comprising:
    a housing for enclosing at least one metal-air cell;
    said at least one metal-air cell comprising an air electrode;
    said housing comprising at least one air inlet and at least one air outlet;

an air movement device positioned to force air into said air inlet and out of said air outlet when said air movement device is active;

said air inlet and said air outlet sized to restrict the flow of air therethrough when said air movement device is inactive;

a voltage sensor connected to said air electrode to monitor the voltage across said air electrode; and control means for operating said air movement device responsive to said voltage sensor.

24. A metal-air power supply, comprising:

at least one air electrode isolated from ambient air except through at least one passageway;

at least one air moving device operative to move air through said passageway to provide reactant air to said air electrode;

said passageway being operative, while unsealed and while said air moving device is inactive, to restrict air flow through said passageway; and an air moving device controller comprising a voltage sensor to monitor the voltage across said air electrode wherein the operation of said air moving device is responsive to said air moving device controller.

25. A method of maintaining a metal-air cell in operative condition without the presence of a load, said method comprising the steps of:

confining at least one metal-air cell within a housing, said at least one metal-air cell comprising an air electrode and said housing comprising an air movement device and at least one air passageway;

sensing the voltage across said air electrode;

activating said air movement device when the voltage across said air electrode is less than or equal to a predetermined voltage so as to move air through passageway; and deactivating said air movement device when the voltage across said air electrode is greater than or equal to a second predetermined voltage.

26. A system for maintaining a metal-air cell in a ready condition not under a load, comprising:

at least one metal-air cell including an air electrode;

an air chamber adjacent to said air electrode;

at least one passageway entering said air chamber;

an air moving device operative to move air through said passageway;

a voltage sensor connected to monitor the voltage across said air electrode; and a controller configured to:
    activate said air moving device when the voltage across said air electrode is less than or equal to a predetermined voltage; and
    deactivate said air moving device when the voltage across said air electrode is greater than or equal to a second predetermined voltage.

* * * * *

UNITED STATES PATENT AND TRADEMARK OFFICE
CERTIFICATE OF CORRECTION

PATENT NO.    : 6,106,962
DATED         : August 22, 2000
INVENTOR(S)   : Pedicini et al.

Page 1 of 1

It is certified that error appears in the above-identified patent and that said Letters Patent is hereby corrected as shown below:

<u>Title page,</u>
Item [56] References Cited,
FOREIGN PATENT DOCUMENTS, line 1, "0 440 060" should read -- 0 044 060 --.

Signed and Sealed this

Second Day of October, 2001

Attest:

NICHOLAS P. GODICI
Attesting Officer    Acting Director of the United States Patent and Trademark Office